United States Patent
Hu et al.

(10) Patent No.: US 10,761,713 B2
(45) Date of Patent: *Sep. 1, 2020

(54) DATA TRANSMISSION METHOD AND APPARATUS

(71) Applicants: Beijing Kingsoft Office Software, Inc, Beijing (CN); ZHUHAI KINGSOFT OFFICE SOFTWARE CO., LTD, Zhuhai (CN); GUANGZHOU KINGSOFT MOBILE TECHNOLOGY CO., LTD., Guangzhou (CN)

(72) Inventors: Juan Hu, Zhuhai (CN); Lanhua Huang, Zhuhai (CN); Dawei Wang, Zhuhai (CN); Haiwei He, Zhuhai (CN); Yong Zhuang, Zhuhai (CN)

(73) Assignees: ZHUHAI KINGSOFT OFFICE SOFTWARE CO., LTD., Guangdong (CN); BEIJING KINGSOFT OFFICE SOFTWARE, INC, Beijing (CN); GUANGZHOU KINGSOFT MOBILE TECHNOLOGY CO., LTD, Guangzhou (CN)

( * ) Notice: Subject to any disclaimer, the term of this patent is extended or adjusted under 35 U.S.C. 154(b) by 76 days.

This patent is subject to a terminal disclaimer.

(21) Appl. No.: 15/532,440

(22) PCT Filed: Nov. 7, 2016

(86) PCT No.: PCT/CN2016/104888
§ 371 (c)(1),
(2) Date: Jun. 1, 2017

(87) PCT Pub. No.: WO2017/092547
PCT Pub. Date: Jun. 8, 2017

(65) Prior Publication Data
US 2018/0039391 A1 Feb. 8, 2018

(30) Foreign Application Priority Data

Dec. 4, 2015 (CN) .......................... 2015 1 0888681

(51) Int. Cl.
*G06F 3/0486* (2013.01)
*G06F 3/0481* (2013.01)
(Continued)

(52) U.S. Cl.
CPC ........ *G06F 3/0486* (2013.01); *G06F 3/04817* (2013.01); *G06F 3/04883* (2013.01);
(Continued)

(58) Field of Classification Search
CPC ............... G06F 3/04817; G06F 3/0486; G06F 3/04886; G06F 2203/04803; G06F 3/04883; H04M 1/72522
See application file for complete search history.

(56) References Cited

U.S. PATENT DOCUMENTS

2008/0077956 A1   3/2008 Morrison et al.
2009/0174732 A1*  7/2009 Lee ....................... G06F 17/212
                                                  345/698
(Continued)

FOREIGN PATENT DOCUMENTS

CN   102043666 A   5/2011
CN   102662600 A   9/2012
(Continued)

OTHER PUBLICATIONS

Office Action issued in corresponding Japanese patent Application No. 2017-533636, dated Jun. 28, 2018 (7 pages).
(Continued)

*Primary Examiner* — Li P Sun
*Assistant Examiner* — Zelalem W Shalu
(74) *Attorney, Agent, or Firm* — Patterson & Sheridan, LLP; Steven Versteeg

(57) ABSTRACT

Embodiments of the present application disclose a data transmission method and apparatus which are to be applied to a source client, wherein a mobile terminal divides the display screen thereof into a first split screen for displaying a running interface of the source client and a second split screen for displaying a running interface of a target client. The method comprises: establishing a communication connection between the source client and the target client; receiving a drag instruction for a thumbnail of target data in the source client and moving the thumbnail according to the drag instruction; monitoring whether a data transmission instruction for the target data is received, if yes, transmitting the target data to the target client through the established communication connection. By applying the embodiments of the present application, users can make full advantage of the split-screen technology, which simplifies data transmission operation.

7 Claims, 7 Drawing Sheets

(51) Int. Cl.
*G06F 3/0488* (2013.01)
*H04M 1/725* (2006.01)

(52) U.S. Cl.
CPC .... *G06F 3/04886* (2013.01); *H04M 1/72522* (2013.01); *G06F 2203/04803* (2013.01)

(56) References Cited

U.S. PATENT DOCUMENTS

| | | | | |
|---|---|---|---|---|
| 2010/0188352 | A1* | 7/2010 | Ikeda | G06F 3/04883 345/173 |
| 2010/0201645 | A1* | 8/2010 | Asami | G06F 3/04842 345/173 |
| 2011/0004489 | A1 | 1/2011 | Schoenberg et al. | |
| 2011/0119610 | A1 | 5/2011 | Hackborn et al. | |
| 2012/0289290 | A1* | 11/2012 | Chae | G06F 3/0488 455/566 |
| 2013/0031484 | A1* | 1/2013 | Kluttz | G06F 16/168 715/748 |
| 2014/0157163 | A1 | 6/2014 | Strutin-Belinoff et al. | |
| 2014/0173455 | A1 | 6/2014 | Shimizu et al. | |
| 2014/0282013 | A1 | 9/2014 | Amijee | |
| 2015/0058723 | A1* | 2/2015 | Cieplinski | G06F 3/04855 715/702 |
| 2015/0135075 | A1* | 5/2015 | Ubillos | G11B 27/034 715/716 |
| 2015/0242086 | A1 | 8/2015 | Mindlin | |
| 2017/0115849 | A1* | 4/2017 | Yang | G06F 3/04817 |

FOREIGN PATENT DOCUMENTS

| | | |
|---|---|---|
| CN | 103516904 A | 1/2014 |
| CN | 103645897 A | 3/2014 |
| CN | 104092815 A | 10/2014 |
| CN | 104317508 A | 1/2015 |
| CN | 104777983 A | 7/2015 |
| JP | 2010250463 A | 11/2010 |
| JP | 2011524554 A | 9/2011 |
| JP | 2012243163 A | 12/2012 |
| JP | 2014013567 A | 1/2014 |
| JP | 2014120859 A | 6/2014 |
| JP | 2014123252 A | 7/2014 |
| JP | 2014179036 A | 9/2014 |
| JP | 2014209343 A | 11/2014 |

OTHER PUBLICATIONS

Office Action issued in corresponding Japanese Patent Application No. 2017-533636, dated Mar. 22, 2019, (7 pages).
Office Action issued in corresponding Chinese Patent Application No. 201510888681.4, dated Mar. 27, 2019 (13 pages).
International Preliminary Report on Patentability issued in International Patent Application No. PCT/CN2016/104888, dated Jun. 5, 2018 (5 pages).
Written Opinion issued in International Patent Application No. PCT/CN2016/104888, dated Jan. 26, 2017 (4 pages).
Extended European Search Report issued in corresssponding European Patent Application No. 16869857.9, dated Jun. 17, 2019 (6 pages).
Office Action issued in corresponding Japanese Patent Application No. 2017-533636, dated Jun. 28, 2019 (2 pages).

* cited by examiner

DATA TRANSMISSION METHOD AND APPARATUS

CROSS REFERENCE TO RELATED APPLICATION

The present application claims the benefit of priority to Chinese patent application No. 201510888681.4, filed before Chinese Patent Office on Dec. 4, 2015 and entitled "Data Transmission Method and Apparatus", which is incorporated herein by reference in its entirety.

TECHNICAL FIELD

The present application relates to the field of information processing technology, in particular to a data transmission method and apparatus.

BACKGROUND

In recent years, mobile devices are widely used and the related technology associated with the mobile devices is becoming mature.

At present, split-screen technology has been successfully applied to mobile devices. In a mobile devices with split-screen function, the display screen can be divided into two parts, which are respectively used for displaying running interfaces of two application clients in a foreground running status in the mobile device. In this way, when users want to view the running interfaces of the two application clients, they can view them simultaneously on the two split screens without the need to close the running interface of one application client and then opening the running interface of the other application client.

After a mobile device is provided with the split-screen function, although the users can process multiple tasks simultaneously in this mobile device without the need to switch the application clients frequently, two methods are generally used when transmitting data between two application clients both in the foreground running status in this mobile device:

one method consists in that a source application client stores target data into the mobile device and then a target application client obtains the above target data from the mobile device and inserts the target data into corresponding locations;

the other method consists in that a source application client chooses, via a menu, a target application client to open the target data and thereby transmits the target data to the target application client.

In the prior art, it is necessary to perform several steps in order to complete data transmission when transmitting data between two application clients both in the foreground running status in a mobile device, thus rendering the operation complicated.

SUMMARY OF THE INVENTION

The object of embodiments of the present application is to provide a data transmission method and apparatus to simplify data transfer operations.

In order to achieve the above object, an embodiment of the present application discloses a data transmission method which is to be applied to a source client, wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal, wherein, the method comprises:

establishing a communication connection between the source client and the target client in the case that a preset condition of establishing a communication connection is satisfied;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

In an implementation, the source client comprises a communication unit $T_{U1}$, and the target client comprises a communication unit $T_{U2}$, the communication unit $T_{U1}$ being identical to the communication unit $T_{U2}$;

the step of establishing a communication connection between the source client and the target client comprises:

establishing the communication connection between the source client and the target client by invoking the communication unit $T_{U1}$ to establish a communication connection with the communication unit $T_{U2}$.

In an implementation, the step of establishing a communication connection between the source client and the target client in the case that a preset condition of establishing a communication connection is satisfied comprises:

monitoring whether the duration of a long press operation on the thumbnail of the target data in the source client by a user is greater than a preset duration;

if yes, establishing the communication connection between the source client and the target client.

In an implementation, after moving the thumbnail according to the drag instruction, the method further comprises:

determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information of the thumbnail and a pattern of the thumbnail to the target client through the established communication connection so that the target client determines a location $T_2$ of the thumbnail on the second split screen and a portion to be displayed $D_{S2}$ of the thumbnail on the second split screen according to the received information and displays the portion to be displayed $D_{S2}$ at the location $T_2$, wherein the portion to be displayed $D_{S1}$ and the portion to be displayed $D_{S2}$ constitute the whole of the thumbnail.

In an implementation, the step of monitoring whether a data transmission instruction for the target data is received comprises:

monitoring whether the ratio of the portion to be displayed $D_{S2}$ of the thumbnail displayed on the second split screen to the whole of the thumbnail is greater than a preset ratio threshold when a release operation on the thumbnail is performed by a user;

if yes, determining that the data transmission instruction for the target data is received.

In order to achieve the above object, an embodiment of the present application also discloses a data transmission apparatus which is to be applied to a source client, wherein the source client is a client in a foreground running state in a mobile terminal, the mobile terminal, by means of a split-screen function, divides a display screen thereof into a first split screen for displaying a running interface of the source client and a second split screen for displaying a running interface of a target client, the target client is a client in a foreground running status in the mobile terminal, wherein the apparatus comprises a communication connection establishing unit, a drag instruction receiving unit, a data transmission instruction monitoring unit and a data transmitting unit;

wherein, the communication connection establishing unit is used for establishing a communication connection between the source client and the target client in the case that a preset condition of establishing a communication connection is satisfied;

the drag instruction receiving unit is used for receiving a drag instruction for a thumbnail of target data in the source client and moving the thumbnail according to the drag instruction;

the data transmission instruction monitoring unit is used for monitoring whether a data transmission instruction for the target data is received; if yes, triggering the data transmitting unit.

the data transmitting unit is used for transmitting the target data to the target client through the established communication connection.

In an implementation, the source client comprises a communication unit $T_{U1}$, and the target client comprises a communication unit $T_{U2}$, the communication unit $T_{U1}$ being identical to the communication unit $T_{U2}$;

the communication connection establishing unit is specifically used for:

in the case that the preset condition of establishing a communication connection is satisfied, establishing the communication connection between the source client and the target client by invoking the communication unit $T_{U1}$ to establish a communication connection with the communication unit $T_{U2}$.

In an implementation, the communication connection establishing unit comprises a long press operation monitoring subunit and a communication connection establishing subunit;

wherein, the long press operation monitoring subunit is used for monitoring whether the duration of a long press operation on the thumbnail of the target data in the source client by a user is longer than a preset duration, if yes, triggering the communication connection establishing subunit;

the communication connection establishing subunit is used for establishing the communication connection between the source client and the target client.

In an implementation, the apparatus further comprises a display portion determining unit, which is used for determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail.

In an implementation, the data transmission instruction monitoring unit comprises a thumbnail monitoring subunit and a data transmission instruction determining subunit;

wherein, the thumbnail monitoring subunit is used for monitoring whether the ratio of the portion to be displayed $D_{S2}$ of the thumbnail displayed on the second split screen to the whole of the thumbnail is greater than a preset ratio threshold when a release operation on the thumbnail is performed by a user, if yes, triggering the data transmission instruction determining subunit;

the data transmission instruction determining subunit is used for determining that the data transmission instruction for the target data is received.

In order to achieve the above object, an embodiment of the present application also discloses a mobile terminal comprising a display screen, a housing, a processor, a memory, a circuit board and a power supply circuit, wherein the circuit board is disposed inside the space enclosed by the housing, the processor and the memory is provided on the circuit board, the power supply circuit is used for supplying power to each circuit or device of the mobile terminal, the memory is used for storing executable program codes, the display screen is divided into a first split screen for displaying a running interface of a source client which is a client in a foreground running state in the mobile terminal and a second split screen for displaying a running interface of a target client which is a client in a foreground running state in the mobile terminal, the processor performs the following steps by executing the executable program codes of the source client stored in the memory:

establishing a communication connection between the source client and the target client in the case that a preset condition of establishing a communication connection is satisfied;

receiving a drag instruction for a thumbnail of target data in the source client and moving the thumbnail according to the drag instruction;

monitoring whether a data transmission instruction for the target data is received; if yes, transmitting the target data to the target client through the established communication connection.

In an implementation, the source client comprises a communication unit $T_{U1}$, and the target client comprises a communication unit $T_{U2}$, the communication unit $T_{U1}$ being identical to the communication unit $T_{U2}$;

the mobile terminal is specifically used for:

establishing the communication connection between the source client and the target client by invoking the communication unit $T_{U1}$ to establish a communication connection with the communication unit $T_{U2}$.

In an implementation, the mobile terminal is further used for:

determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail.

In order to achieve the above object, an embodiment of the present application also discloses executable program codes for performing the following steps when being executed:

establishing a communication connection between the source client and the target client in the case that a preset condition of establishing a communication connection is satisfied; wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

In order to achieve the above object, an embodiment of the present application also discloses a storage medium for storing executable program codes, the executable program codes being executed to perform the following steps:

establishing a communication connection between the source client and the target client in the case that a preset condition of establishing a communication connection is satisfied; wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

It can be seen that in the embodiments of the present application, the mobile terminal divides the display screen thereof into a first split screen and a second split screen by means of the split-screen function and can simultaneously display running interfaces of two application clients, and data transmission between the two application clients in a foreground running status in this mobile terminal is completed by dragging thumbnails. The method simplifies data transmission operation compared with the method for transmitting data between application clients in prior art.

BRIEF DESCRIPTION OF DRAWINGS

In order to describe embodiments of the present application or technical solutions in prior art more clearly, drawings used for describing embodiments of the present application or the prior art will be described briefly below. It is obvious that the drawings below are for only some embodiments of the present application, and those skilled in the art can also obtain further drawings based on these drawings without creative efforts.

DETAILED DESCRIPTION OF THE INVENTION

Technical solutions in the embodiments of the present application will be described below clearly and completely in combination with the drawings of the embodiments of the present application. Obviously, the described embodiments are only some of the embodiments of the present application, rather than all of the embodiments. All other embodiments obtained based on the embodiments of the present application by those skilled in the art without doing creative works fall into the protection scope defined by the present application.

The embodiments of the present application discloses a data transmission method and apparatus, which are to be applied to a source client, wherein the source client is a client in a foreground running status in a mobile terminal, the mobile terminal, by means of a split-screen function, divides a display screen thereof into a first split screen for displaying a running interface of the source client and a second split screen for displaying a running interface of a target client, the target client is a client in a foreground running status in the mobile terminal. The method comprises: establishing a communication connection between the source client and the target client; receiving a drag instruction for a thumbnail of target data in the source client and moving the thumbnail according to the drag instruction; monitoring whether a data transmission instruction for the target data is received, if yes, transmitting the target data to the target client through the established communication connection.

The present application will be described in detail below by means of detailed embodiments.

Figure 1:
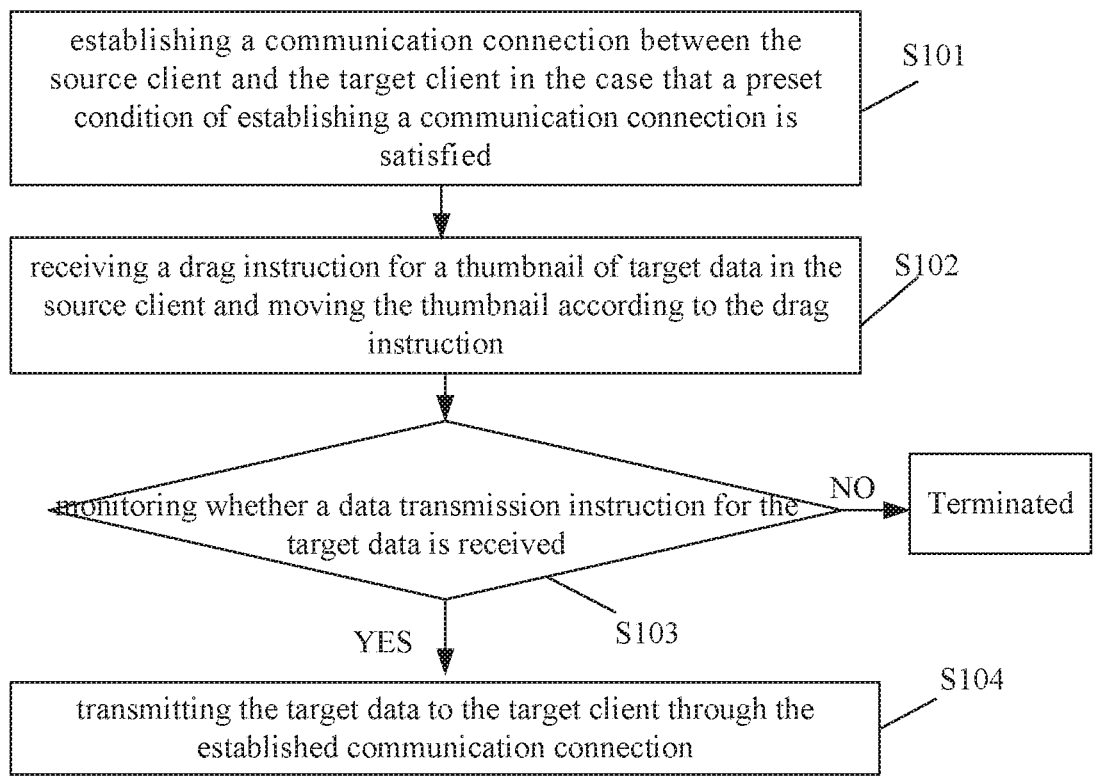
FIG. 1 is a schematic flowchart of a data transmission method provided by an embodiment of the present application.

Refer to FIG. 1 that is a schematic flowchart of a data transmission method provided by an embodiment of the present application. The method is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in a foreground running status in the mobile terminal. The method comprises the following steps:

S101: establishing a communication connection between the source client and the target client in the case that a preset condition of establishing a communication connection is satisfied;

In one implementation of the present application, the step of establishing a communication connection between the source client and the target client in the case that a preset condition of establishing a communication connection is satisfied may comprise:

monitoring whether a communication connection establishing instruction for the target client is received;

if yes, establishing the communication connection between the source client and the target client;

otherwise, terminating the procedure of establishing a communication connection.

It is obvious that, in other embodiments of the present application, if no communication connection establishing instruction for the target client is received during the monitoring process, then the procedure of establishing a communication connection is terminated and the next procedure of establishing a communication connection can be carried out.

It is to be noted that the source client may comprise a communication unit $T_{U1}$, and the target client may comprise a communication unit $T_{U2}$, the communication unit $T_{U1}$ being identical to the communication unit $T_{U2}$. In this case, the step of establishing a communication connection between the source client and the target client may comprise:

establishing the communication connection between the source client and the target client by invoking the communication unit $T_{U1}$ to establish a communication connection with the communication unit $T_{U2}$.

In a specific implementation of the present application, the source client monitors at any time whether a communication connection establishing instruction for the target client is received. If a communication connection establishing instruction for the target client is received during the monitoring process, then the communication unit $T_{U1}$ is invoked to establish a communication connection with the communication unit $T_{U2}$ in the target client. The communication connection is essentially the communication connection between the source client and the target client, which allows data transmission between the source client and the target client. If no communication connection establishing instruction for the target client is received during the monitoring process, then establishing a communication connection between the source client and the target client is refused.

Moreover, the established communication connection can always exist, and data transmission can be carried out at any time between the source client and the target client; the established communication connection can also allow data transmission to be carried out only once. Furthermore, the established communication connection can also exist for a period of time, during which data transmission can be carried out at any time between the source client and the target client. This is not limited by the present application.

A client in a foreground running status as mentioned above can be simply understood as a client whose running interface is visible.

S102: receiving a drag instruction for a thumbnail of target data in the source client and moving the thumbnail according to the drag instruction; Wherein, the thumbnail can be a section of text or a picture or a table, or can also be a file icon, or can also be a polygon representing the target data, which is not limited by the present application.

S103: monitoring whether a data transmission instruction for the target data is received, and if yes, executing step S104, otherwise, terminating the data transmission;

It is obvious that, in other embodiments of the present application, if no data transmission instruction for the target data in the source client is received during the monitoring process, then the data transmission is terminated, or transmission of next target data can be carried out, or the communication connection between the target client and the source client can be re-establish.

S104: transmitting the target data to the target client through the established communication connection;

In practice, in the case that a communication connection is established, when a data transmission instruction for target data in a source client is received, it is possible to transmit the target data to the target client through this communication connection.

For example, two application clients in a foreground running status on two split-screens of a mobile terminal are a QQ client and a WPS client respectively, the thumbnail of target data can be directly dragged from the QQ client to the WPS client by a user in a dragging manner, and the target data is transmitted to the WPS client when a data transmission instruction is received.

Moreover, if the QQ client and the WPS client in the foreground running status on the two split-screens of a mobile terminal are both provided with a communication unit, such as WPS SDK, the communication connection can be established through the communication units. If a picture "a" in the QQ client is required to be delivered to the WPS client, it is possible to transmit location information and a pattern of the thumbnail of the picture "a" through the communication connection established by the communication units, and when a data transmission instruction is received, to transmit data of the picture "a" through the communication connection established by the communication units.

It should be noted that data transmission can occur during moving a thumbnail, or can also occur after moving a thumbnail, which is not limited by the present application.

By applying the embodiment of FIG. 1, a mobile terminal divides a display screen thereof into a first split screen and a second split screen by means of the split-screen function and can simultaneously display running surfaces of two clients. Data transmission between two application clients in the foreground running status in this mobile terminal is realized in a dragging manner. This method simplifies data transmission operation compared with the methods for transmitting data between clients in the prior art.

Figure 2:
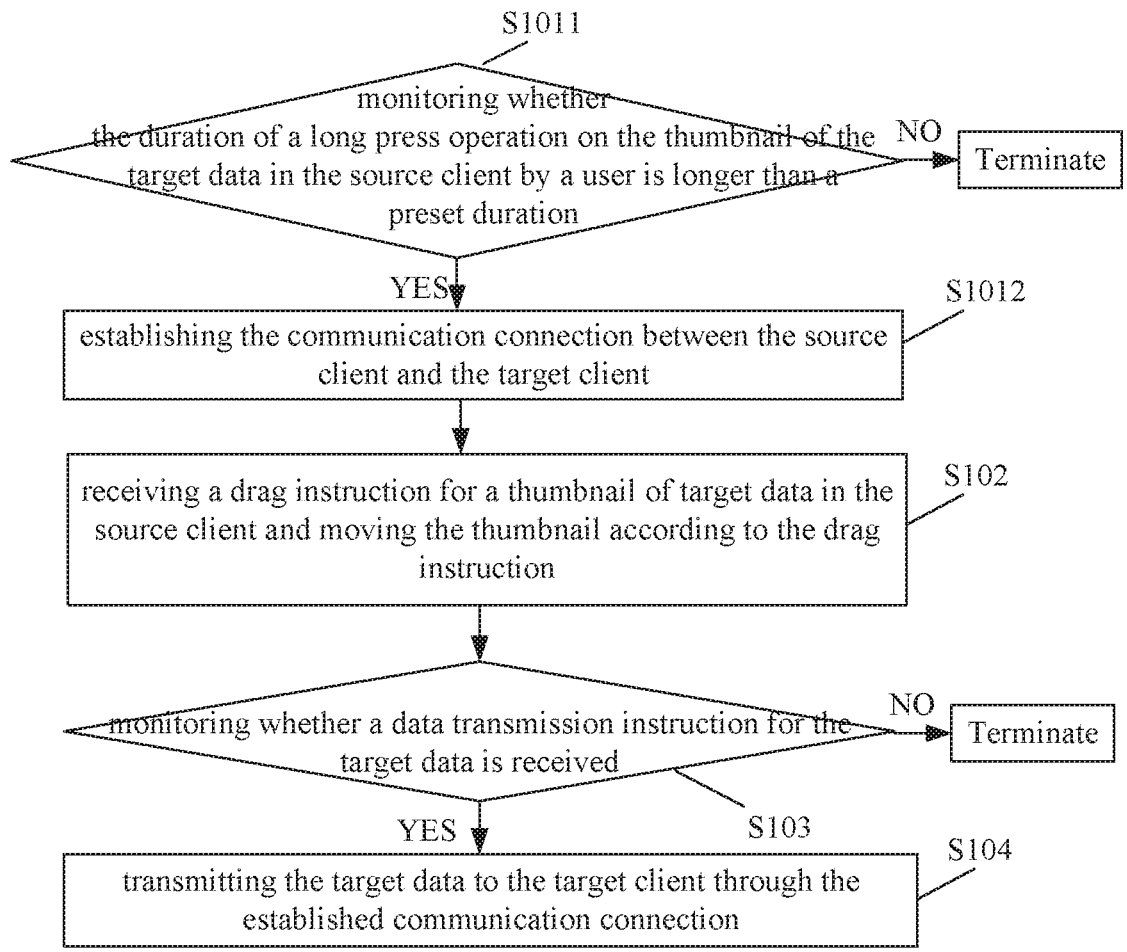
FIG. 2 is a schematic flowchart of another data transmission method provided by an embodiment of the present application.

Moreover, an embodiment of the present application provides another data transmission method. Refer to FIG. 2, which is a schematic flowchart of another data transmission method provided by an embodiment of the present application. The method is to be applied to a source client, wherein the source client is a client in a foreground running status in a mobile terminal. The mobile terminal, by means of a split-screen function, divides a display screen thereof into a first split screen for displaying a running interface of the source client and a second split screen for displaying a running interface of a target client, the target client is a client in a foreground running status in the mobile terminal. The step S101 in the method may comprises the following steps:

S1011: monitoring whether the duration of a long press operation on the thumbnail of the target data in the source client by a user is longer than a preset duration, if yes, continuing to execute step S1012, otherwise, terminating the monitoring process.

Of course, in other embodiments of the present application, if the duration of a long press operation on the target data in the source client by a user is shorter than the preset duration, then the monitoring process is terminated, and the next procedure of monitoring whether the duration of a long press operation is longer than a preset duration can be carried out;

S1012: establishing the communication connection between the source client and the target client.

According to the example in the above step S104, if the preset duration is 5 s and it is monitored that the picture "a" in the QQ client is pressed by a user for 6 s, then since 6 s is longer than 5 s, the QQ client determines that a communication connection establishing instruction for the WPS client is received and establishes a communication connection between the QQ client and the WPS client. At that time, the user can carry out a dragging operation, drag the thumbnail of the picture "a" into the WPS client, and sends the picture "a" to the WPS client when a data transmission instruction is received.

By applying the embodiment of FIG. 2, a mobile terminal divides the display screen thereof into a first split screen and a second split screen by means of a split-screen function and can simultaneously display running surfaces of two application clients. Data transmission between two clients in a foreground running status in this mobile terminal is completed in a dragging manner. This method simplifies data transmission operation compared with the method for transmitting data between clients in the prior art.

Figure 3:
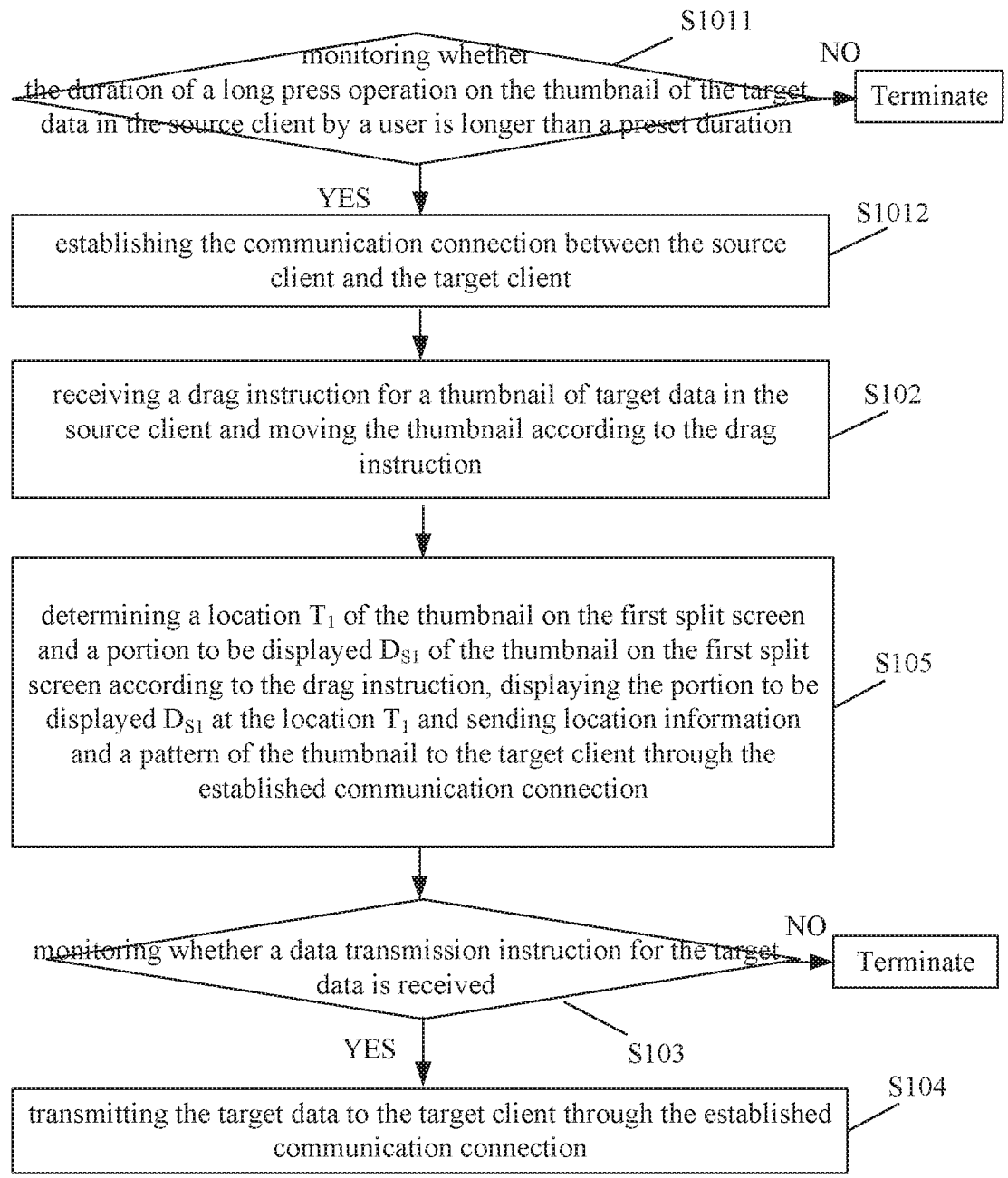
FIG. 3 is a schematic flowchart of another data transmission method provided by an embodiment of the present application.

Moreover, when a thumbnail of target data is a specific image, such as a section of text, a picture, a table or a file icon related to the target data, an embodiment of the present application provides another data transmission method. Refer to FIG. 3, which is a schematic flowchart of another data transmission method provided by an embodiment of the present application. The method is to be applied to a source client, wherein the source client is a client in a foreground running status in a mobile terminal. The mobile terminal, by means of a split-screen function, divides a display screen thereof into a first split screen for displaying a running interface of the source client and a second split screen for displaying a running interface of a target client, the target client is a client in a foreground running status in the mobile terminal. The method may further comprise the following steps:

S105: determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$ and sending location information and a pattern of the thumbnail to the target client through the established communication connection.

With this method, it is possible for the target client to determine a location $T_2$ of the thumbnail of the target data on the second split screen and a portion to be displayed $D_{S2}$ of the thumbnail on the second split screen according to the received information, and display the portion to be displayed $D_{S2}$ at the location $T_2$, wherein, the portion to be displayed $D_{S1}$ and the portion to be displayed $D_{S2}$ constitute the whole of the thumbnail.

Figure 4:
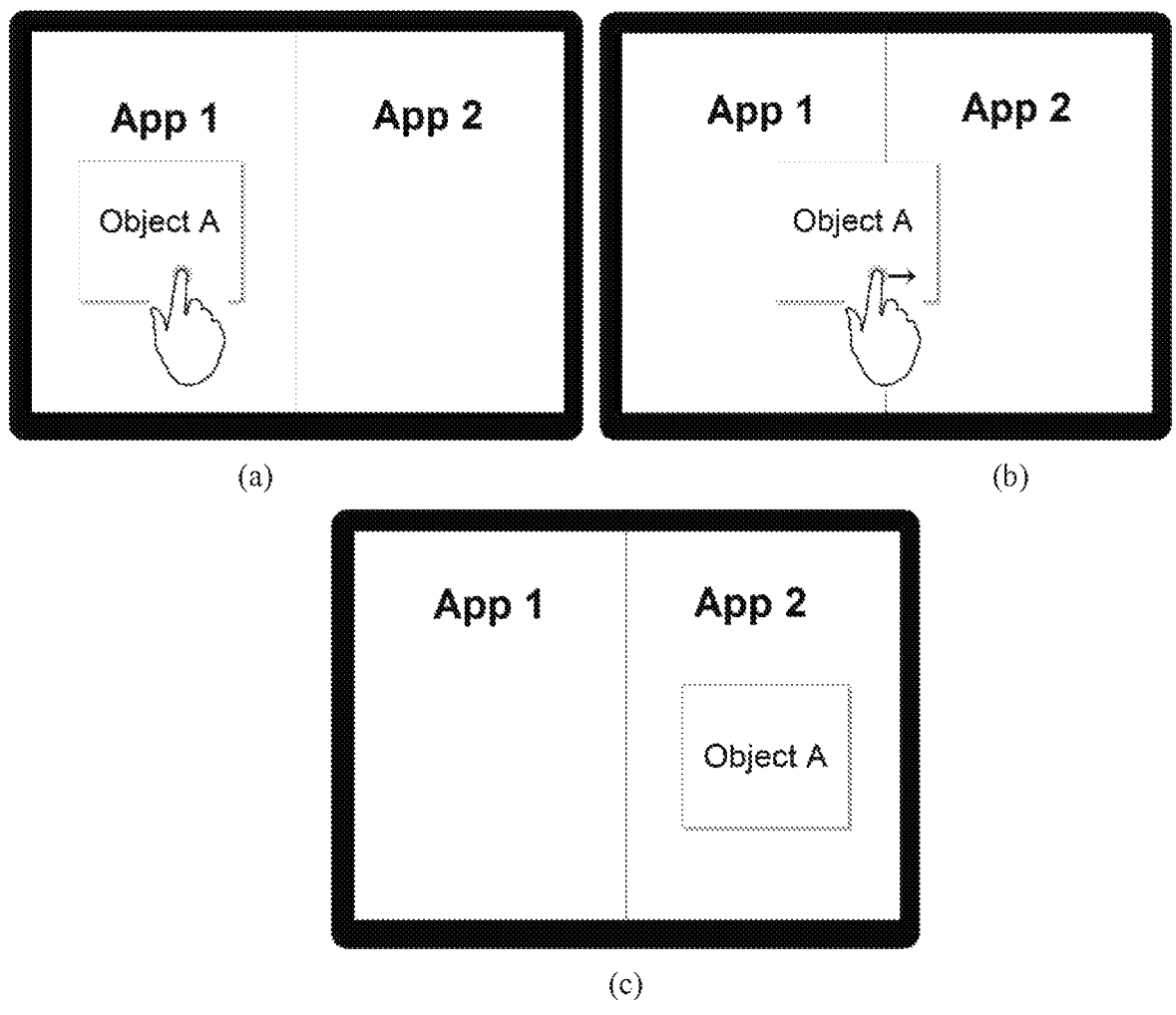
FIG. 4 is a schematic diagram of a dragging operation provided by an embodiment of the present application.

Wherein, the location information mentioned above can be the location of the thumbnail with respect to the whole screen, and the pattern of the thumbnail can be information such as the shape (e.g. rectangle, circular, polygon, etc.), the size or the pixel of the thumbnail. As shown in FIG. 4(a), (b), (c) which are schematic illustration of a dragging operation provided by an embodiment of the present application, it is possible to display a corresponding thumbnail during the thumbnail dragging process according to the information. As can be seen from FIG. 4, the target data (object A), when being dragged into the target client (App2) first passes (a), and then (b) and finally (c), and then the target data transmission is completed.

During the dragging process, the source client acquires the location information of a thumbnail with respect to the whole screen and the pattern of the thumbnail, and sends these information to the target client; the source client determines the location $T_1$ of the thumbnail on the first split screen according to the acquired location information, and determines the content of the thumbnail to be displayed at the location $T_1$, i.e. the portion to be displayed $D_{S1}$, according to the pattern of the thumbnail corresponding to the location information; the target client determines the location $T_2$ of the thumbnail on the second split screen according to the received location information, and determines the content of the thumbnail to be displayed at the location $T_2$, i.e., the portion to be displayed $D_{S2}$, according to the pattern of the thumbnail corresponding to the location information. As shown in FIG. 4(b), the thumbnail of the target data (object A) is dragged to the segment line of the split screens, a portion of the thumbnail of the target data is displayed in the source client (App1), the other portion of the thumbnail of the target data is displayed in the target client (App2), and the thumbnails of these two portions constitute the whole of the thumbnail of the target data (object A), which creates an effect of traversing to the target client (App2) and provides users with an excellent visual effect.

Moreover, in an implementation, when the thumbnail of the target data is an abstractive icon such as a polygon representing target data, upon receiving a data transmission instruction, the thumbnail of the target data moves in a leap to the location where the release operation is performed when a data transmission instruction is received, or the thumbnail of the target data can be displayed immediately at the location where the release operation is performed when a data transmission instruction is received.

By applying the embodiment of FIG. 3, a mobile terminal divides the display screen thereof into a first split screen and a second split screen by means of the split-screen function and can simultaneously display running surfaces of two clients. Data transmission between two application clients in a foreground running status in this mobile terminal is realized in a dragging manner. The method simplifies data transmission operation compared with the method for transmitting data between clients in the prior art.

Figure 5:
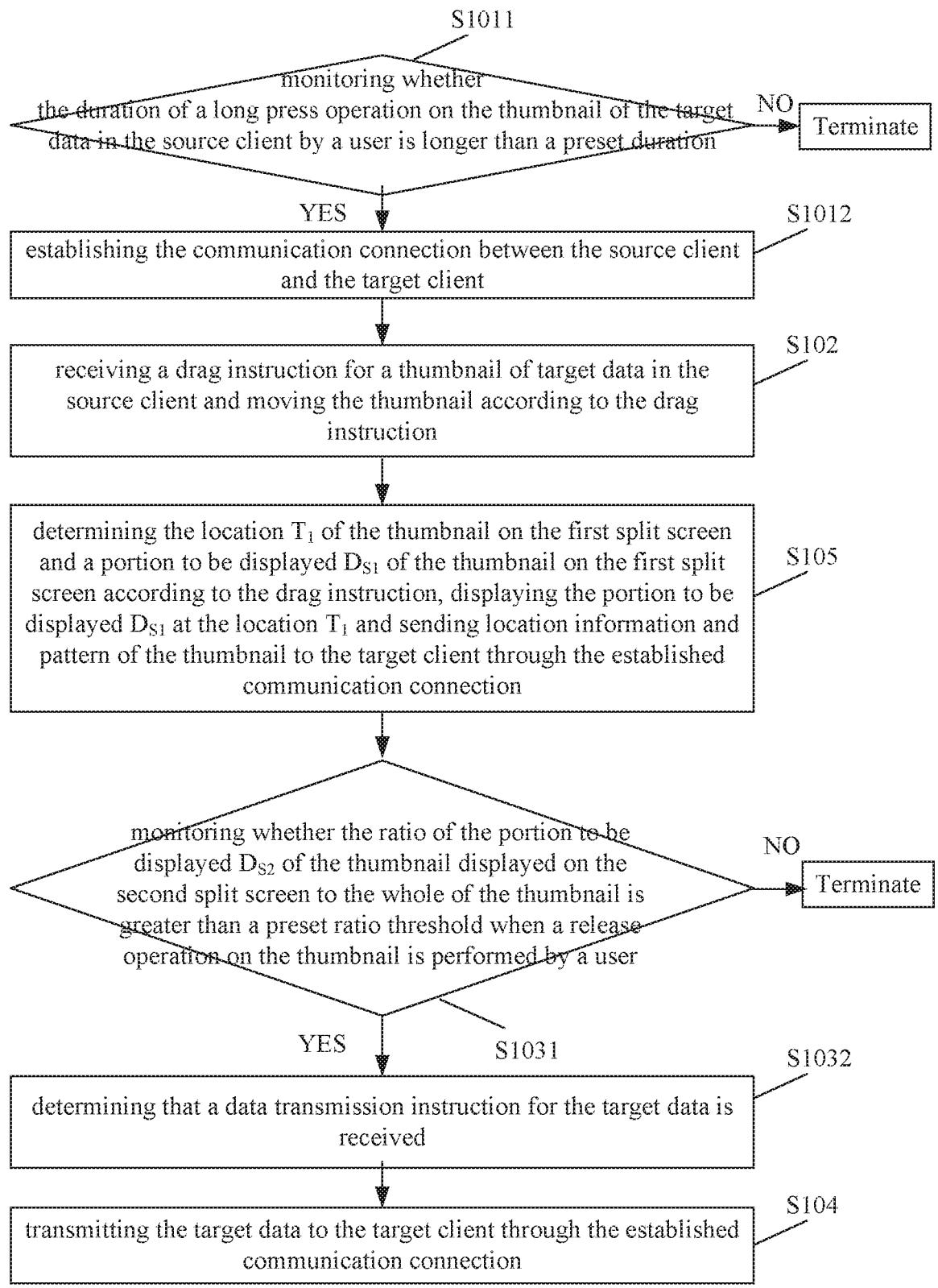
FIG. 5 is a schematic flowchart of another data transmission method provided by an embodiment of the present application.

Moreover, an embodiment of the present application provides another data transmission method. Refer to FIG. 5, which is a schematic flowchart of another data transmission method provided by an embodiment of the present application. The method is to be applied to a source client, wherein the source client is a client in a foreground running status in a mobile terminal. The mobile terminal, by means of split-screen function, divides the display screen thereof into a first split screen for displaying a running interface of the source client and a second split screen for displaying a running interface of a target client, the target client is a client in a foreground running status in the mobile terminal. The step S103 in the method may comprise the following steps:

S1031: monitoring whether the ratio of the portion to be displayed $D_{S2}$ of the thumbnail displayed on the second split screen to the whole of the thumbnail is greater than a preset ratio threshold when a release operation on the thumbnail is performed by a user; if yes, executing the step S1032, otherwise, terminating the data transmission.

S1032: determining that a data transmission instruction for the target data is received.

It is obvious that, in other embodiments of the present application, if the ratio of the portion to be displayed $D_{S2}$ of a thumbnail displayed on the second split screen to the whole of the thumbnail is not greater than the preset ratio threshold when a release operation is performed, then the data transmission is terminated. Monitoring whether the ratio of the portion to be displayed $D_{S2}$ of a thumbnail displayed on the second split screen to the whole of the thumbnail is not greater than a preset ratio threshold can be done again when a release operation is performed, and the communication connection between the source client and the target client can be re-established.

Assume that the preset ratio threshold is ½, the ratio of the portion to be displayed $D_{S2}$ displayed on the second split screen to the whole of the thumbnail is ¾ when a release operation is performed, then it is determined that a data transmission instruction for target data is received since ¾>½. Here, the preset ratio threshold can be modified according to the requirements of users and can be set to be ⅓, ⅔, ¾ or 1, which is not limited by the present application.

In practice, the preset ratio threshold is for example 1, then determining whether the whole thumbnail is displayed on the second split screen when a release operation is performed, and if yes, it is determined that a data transmission instruction for the target data is received.

In an implementation, determining whether a whole thumbnail is displayed on the second split screen when a release operation is performed can consist in: determining whether the point where a user touches the screen of a mobile is located on the second split screen, if yes, it can be determined that the whole thumbnail is displayed on the second split screen, therefore it is determined that a data transmission instruction for target data is received, and then the target data is transmitted.

In another implementation, determining whether a whole thumbnail is displayed on the second split screen when a release operation is performed can consist in: determining whether the portion to be displayed of the thumbnail is completely displayed on the second split screen, if yes, it can be determined that the whole thumbnail is displayed on the second split screen, therefore it is determined that a data transmission instruction for the target data is received, then the target data is transmitted; otherwise, as shown in FIG. 4(b), a portion of the thumbnail is displayed on the first split screen and the other portion is displayed on the second split screen, then it is determined that no data transmission instruction for the target data is received and data transmission is refused.

By applying the embodiment of FIG. 5, a mobile terminal divides the display screen thereof into a first split screen and a second split screen by means of the split-screen function and can simultaneously display running surfaces of two clients. Data transmission between two clients in a foreground running status in the mobile terminal is completed in a dragging manner. The method simplifies data transmission operation compared with the method for transmitting data between clients in the prior art.

Figure 6:
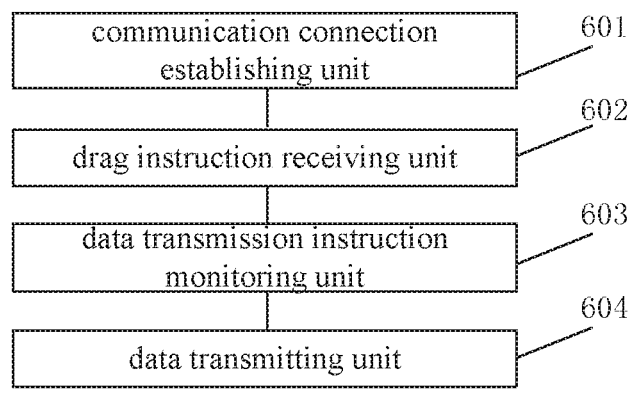
FIG. 6 is a schematic structural illustration of a data transmission apparatus provided by an embodiment of the present application.

Refer to FIG. 6 that is a schematic structural illustration of a data transmission apparatus provided by an embodiment of the present application. The apparatus corresponds to the flowchart as shown in FIG. 1 and is to be applied to a source client, wherein the source client is a client in a foreground running status in a mobile terminal. The mobile terminal, by means of a split-screen function, divides a display screen thereof into a first split screen for displaying a running interface of the source client and a second split screen for displaying a running interface of a target client, the target client is a client in a foreground running status in the mobile terminal. The apparatus can comprise a communication connection establishing unit 601, a drag instruction receiving unit 602, a data transmission instruction monitoring unit 603 and a data transmitting unit 604.

Wherein, the communication connection establishing unit 601 is used for establishing a communication connection between the source client and the target client in the case that a preset condition of establishing a communication connection is satisfied.

The drag instruction receiving unit 602 is used for receiving a drag instruction for a thumbnail of target data in the source client and moving the thumbnail according to the drag instruction.

The data transmission instruction monitoring unit 603 is used for monitoring whether a data transmission instruction for the target data is received; if yes, triggering the data transmitting unit.

The data transmitting unit 604 is used for transmitting the target data to the target client through the established communication connection.

In one implementation, the source client comprises a communication unit $T_{U1}$, the target client comprises a communication unit $T_{U2}$, and the communication unit $T_{U1}$ being identical to the communication unit $T_{U2}$.

In this case, the communication connection establishing unit 601 is specifically used for:

in the case that the preset condition of establishing a communication connection is satisfied, establishing the communication connection between the source client and the target client by invoking the communication unit $T_{U1}$ to establish a communication connection with the communication unit $T_{U2}$.

By applying the embodiment of FIG. 6, a mobile terminal divides a display screen thereof into a first split screen and a second split screen by means of a split-screen function and can simultaneously display running surfaces of two clients. Data transmission between two clients in a foreground running status in the mobile terminal is completed in a dragging manner. The method simplifies data transmission operation compared with the method for transmitting data between clients in the prior art.

Figure 7:
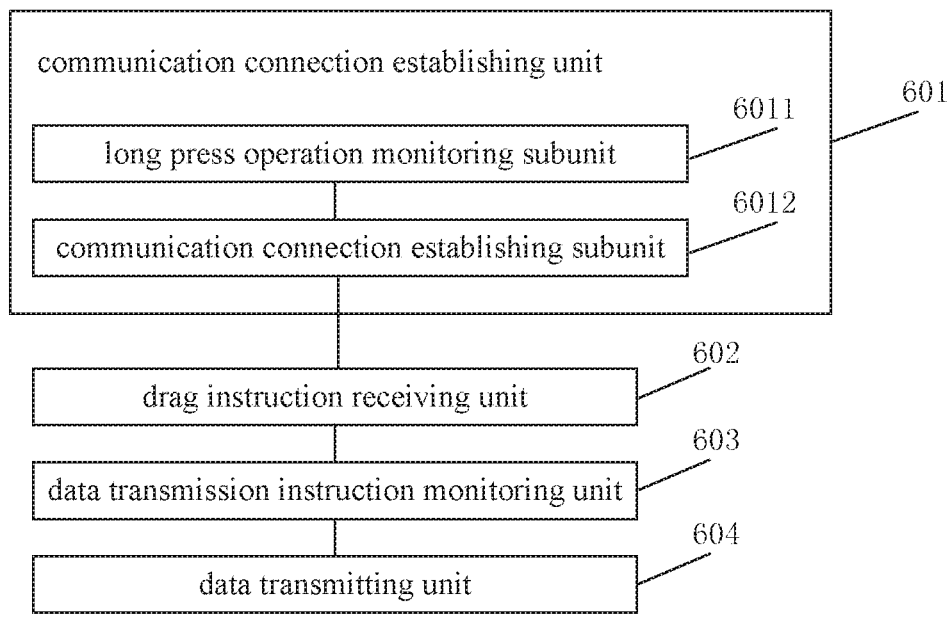
FIG. 7 is a schematic structural illustration of another data transmission apparatus provided by an embodiment of the present application.

Moreover, an embodiment of the present application provides another data transmission apparatus. Refer to FIG. 7, which is a schematic structural illustration of another data transmission apparatus provided by an embodiment of the present application. The apparatus corresponds to the flowchart as shown in FIG. 2 and is to be applied to a source client, wherein the source client is a client in a foreground running status in a mobile terminal. The mobile terminal, by means of a split-screen function, divides a display screen thereof into a first split screen for displaying a running interface of the source client and a second split screen for displaying a running interface of a target client, which is a client in the foreground running status in the mobile terminal. The apparatus can comprise a long press operation monitoring subunit 6011 and a communication connection establishing subunit 6012.

Specifically, the communication connection establishing unit 601 mentioned above can comprise a long press operation monitoring subunit 6011 and a communication connection establishing subunit 6012.

The long press operation monitoring subunit 6011 is used for monitoring whether the duration of a long press operation on the thumbnail of the target data in the source client by the user is longer than a preset duration, if yes, triggering the communication connection establishing subunit 6012.

The communication connection establishing subunit 6012 is used for establishing the communication connection between the source client and the target client.

By applying the embodiment of FIG. 7, a mobile terminal divides the display screen thereof into a first split screen and a second split screen by means of a split-screen function and can simultaneously display running surfaces of two clients. Data transmission between the clients in a foreground running status in the mobile terminal is completed in a dragging manner. The method simplifies data transmission operation compared with the method for transmitting data between clients in the prior art.

Figure 8:
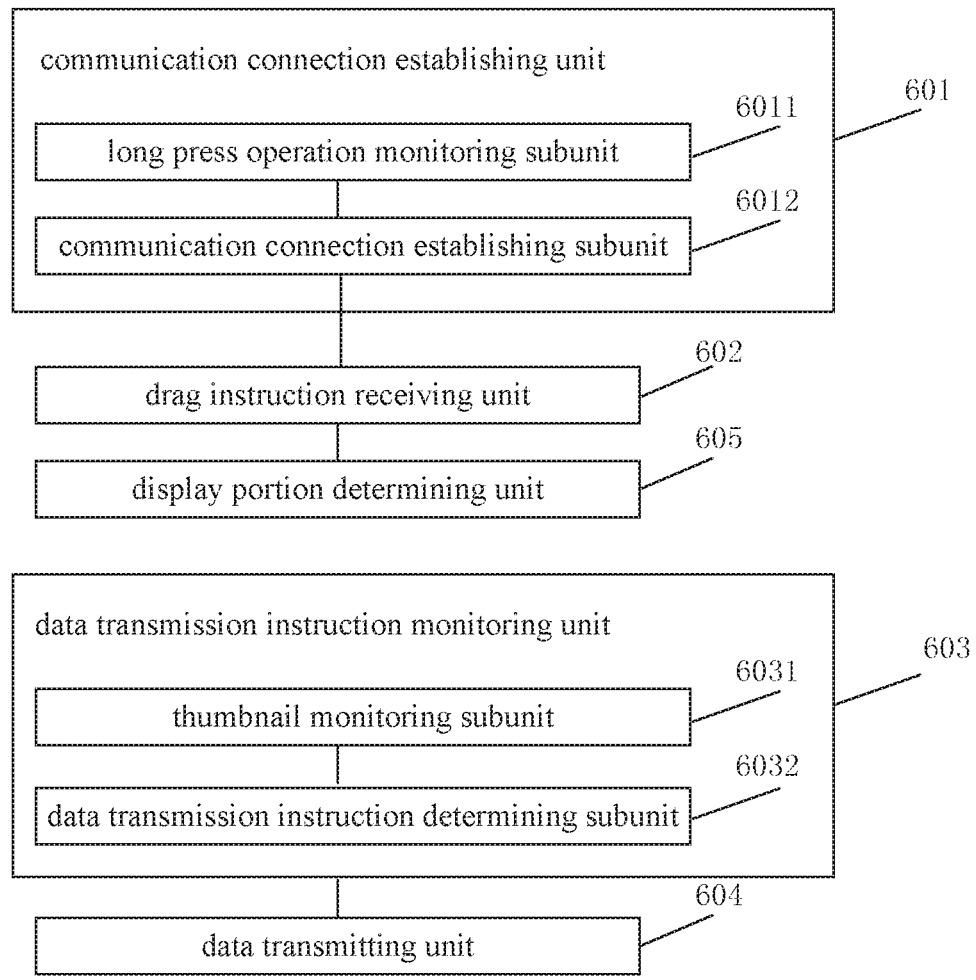
FIG. 8 is a schematic structural illustration of another data transmission apparatus provided by an embodiment of the present application.

Moreover, an embodiment of the present application also provides another data transmission apparatus. Refer to FIG. 8, which is a schematic structural illustration of another data transmission apparatus provided by an embodiment of the present application. The apparatus corresponds to the flowchart as shown in FIG. 5 and is to be applied to a source client, wherein the source client is a client in a foreground running status in a mobile terminal. The mobile terminal, by means of the split-screen function, divides a display screen thereof into a first split screen for displaying a running interface of the source client and a second split screen for displaying a running interface of a target client, the target client is a client in the foreground running status in the mobile terminal. The apparatus can comprise a display portion determining unit 605. Also, the data transmission instruction monitoring unit 603 comprises a thumbnail monitoring subunit 6031 and a data transmission instruction determining subunit 6032.

Wherein, the display portion determining unit 605 is used determining a portion to be displayed $D_{S1}$ of the thumbnail on the first split screen and an area $D_{S11}$ to display the thumbnail on the first split screen according to the drag instruction, displaying the portion to be displayed $D_{S1}$ in the area $D_{S11}$, and sending location information and a pattern of the thumbnail to the target client through the established communication connection, so that the target client determines a portion to be displayed $D_{S2}$ of the thumbnail on the second split screen and an area $D_{S12}$ to display the thumbnail on the second split screen according to the received information, and displays the portion to be displayed $D_{S2}$ in the area $D_{S12}$. Wherein, the portion to be displayed $D_{S1}$ and the portion to be displayed $D_{S2}$ constitute the whole of the thumbnail.

Here, the area $D_{S11}$ to display the thumbnail on the first split screen can be understood as the location $T_1$ of the thumbnail on the first split screen, and the area $D_{S12}$ to display the thumbnail on the second split screen can be understood as the location $T_2$ of the thumbnail on the second split screen.

The thumbnail monitoring subunit 6031 is used for monitoring whether the ratio of the portion to be displayed $D_{S2}$ of the thumbnail displayed on the second split screen to the whole of the thumbnail is greater than a preset ratio threshold when a release operation on the thumbnail is performed by a user, and if yes, triggering the data transmission instruction determining subunit.

The data transmission instruction determining subunit 6032 is used for determining that the data transmission instruction for the target data is received.

By applying the embodiment of FIG. 8, a mobile terminal divides a display screen thereof into a first split screen and a second split screen by means of a split-screen function and can simultaneously display running surfaces of two clients. Data transmission between two clients in a foreground running status in this mobile terminal is completed in a dragging manner. The method simplifies data transmission operation compared with the method for transmitting data between clients in the prior art.

An embodiment of the present application discloses a mobile terminal comprising a display screen, a housing, a processor, a memory, a circuit board, and a power supply circuit, wherein the circuit board is disposed inside the space enclosed by the housing. The processor and the memory are provided on the circuit board. The power supply circuit is used for supplying power to each circuit or device of the mobile terminal. The memory is used for storing executable program codes. The display screen is divided into a first split screen for displaying a running interface of a source client which is a client in a foreground running state in the mobile terminal and a second split screen for displaying a running interface of a target client which is a client in a foreground running state in the mobile terminal. The processor performs the following steps by executing the executable program codes of the source client stored in the memory:

establishing a communication connection between the source client and the target client in the case that a preset condition of establishing a communication connection is satisfied;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

In an implementation, the source client comprises a communication unit $T_{U1}$, and the target client comprises a communication unit $T_{U2}$, the communication unit $T_{U1}$ being identical to the communication unit $T_{U2}$;

the mobile terminal is specifically used for:

establishing the communication connection between the source client and the target client by invoking the communication unit $T_{U1}$ to establish a communication connection with the communication unit $T_{U2}$.

In an implementation, the mobile terminal is further used for:

determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail.

By applying the above embodiment, a mobile terminal divides a display screen thereof into a first split screen and a second split screen by means of a split-screen function and can simultaneously display running surfaces of two clients. Data transmission between two clients in a foreground running status in this mobile terminal is completed in a dragging manner. The method simplifies data transmission operation compared with the method for transmitting data between clients in the prior art.

An embodiment of the present application also discloses executable program codes for performing the following steps when being executed:

establishing a communication connection between the source client and the target client in the case that a preset condition of establishing a communication connection is satisfied; wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal;

receiving a drag instruction for a thumbnail of target data in the source client and moving the thumbnail according to the drag instruction;

monitoring whether a data transmission instruction for the target data is received; if yes, transmitting the target data to the target client through the established communication connection.

By applying the above embodiment, a mobile terminal divides a display screen thereof into a first split screen and a second split screen by means of a split-screen function and can simultaneously display running surfaces of two clients. Data transmission between two clients in a foreground running status in this mobile terminal is completed in a dragging manner. The method simplifies data transmission operation compared with the method for transmitting data between clients in the prior art.

An embodiment of the present application also discloses a storage medium for storing executable program codes, the executable program codes being executed to perform the following steps:

establishing a communication connection between the source client and the target client in the case that a preset condition of establishing a communication connection is satisfied; wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

By applying the above embodiment, a mobile terminal divides a display screen thereof into a first split screen and a second split screen by means of a split-screen function and can simultaneously display running surfaces of two clients. Data transmission between two clients in a foreground running status in this mobile terminal is completed in a dragging manner. The method simplifies data transmission operation compared with the method for transmitting data between clients in the prior art.

The embodiments of the apparatus, mobile terminal, executable program codes and storage medium are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

It can be understood by a person skilled in the art that all or a part of steps in the implementation of the above method can be carried out by related hardware being instructed by programs, which can be stored in computer readable storage medium, such as ROM/RAM, disk and optical disk etc.

The embodiments described above are just preferable embodiments of the present application, and not indented to limit the protection scope of the present application. Any modifications, alternatives, improvements or the like within the spirit and principle of the present application are comprised in the protection scope of the present application.

What is claimed is:

1. A data transmission method, which is to be applied to a source client, wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal, wherein, the method comprises:

monitoring whether a duration of a long press operation on a thumbnail of target data in the first split screen by a user is greater than a preset duration;

in response to the duration of the long press operation on the thumbnail of the target data in the first split screen by the user is greater than the preset duration, establishing a communication connection between the source client and the target client;

receiving a drag instruction for the thumbnail of the target data in the first split screen for moving the thumbnail according to the drag instruction by the user;

when the thumbnail of the target data is moved across a boundary of the first and second split screens according to the drag instructions, determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information of the thumbnail and a pattern of the thumbnail to the target client through the established communication connection so that the target client determines a location $T_2$ of the thumbnail on the second split screen and a portion to be displayed $D_{S2}$ of the thumbnail on the second split screen according to the received information and displays the portion to be displayed $D_{S2}$ at the location $T_2$, wherein the portion to be displayed $D_{S1}$ and the portion to be displayed $D_{S2}$ constitute the whole of the thumbnail;

monitoring whether a ratio of the portion to be displayed $D_{S2}$ of the thumbnail displayed on the second split screen to the whole of the thumbnail is greater than a preset ratio threshold when a release operation on the thumbnail is performed by the user following the drag instruction;

in response to the ratio of the portion to be displayed $D_{S2}$ of the thumbnail displayed on the second split screen to the whole of the thumbnail is greater than the preset ratio threshold when the release operation on the thumbnail is performed by the user:

sending a data transmission instruction for the target data to the target client; and transmitting the target data to the target client for displaying the thumbnail in the second split screen through the established communication connection.

2. The method according to claim 1, wherein, the source client comprises a communication unit $T_{U1}$, and the target client comprises a communication unit $T_{U2}$, the communication unit $T_{U1}$ being identical to the communication unit $T_{U2}$;

the step of establishing a communication connection between the source client and the target client comprises:

establishing the communication connection between the source client and the target client by invoking the communication unit $T_{U1}$ to establish a communication connection with the communication unit $T_{U2}$.

3. A data transmission apparatus, which is to be applied to a source client, wherein the source client is a client in a foreground running state in a mobile terminal, the mobile terminal, by means of a split-screen function, divides a display screen thereof into a first split screen for displaying a running interface of the source client and a second split screen for displaying a running interface of a target client, the target client is a client in a foreground running status in the mobile terminal, wherein the data transmission apparatus comprises a memory that stores executable modules, and a processor that is coupled to the memory and executes or facilitates execution of the executable modules comprising a communication connection establishing unit, a drag instruction receiving unit, a data transmission instruction monitoring unit and a data transmitting unit;

wherein, the communication connection establishing unit is executed to establish a communication connection between the source client and the target client in the case that a preset condition of establishing a communication connection is satisfied; wherein, the communication connection establishing unit comprises a long press operation monitoring subunit and a communication connection establishing subunit, wherein, the long press operation monitoring subunit is executed to monitor whether a duration of a long press operation on a thumbnail of target data in the first split screen by a user is longer than a preset duration, in response to the duration of the long press operation on the thumbnail of the target data in the first split screen by the user is longer than the preset duration, trigger the communication connection establishing subunit; the communication connection establishing subunit is executed to establish the communication connection between the source client and the target client;

the drag instruction receiving unit is executed to receive a drag instruction for the thumbnail of the target data in the first split screen to move the thumbnail according to the drag instruction by the user;

the data transmission instruction monitoring unit is executed to monitor whether a data transmission instruction for the target data is received; if the data transmission instruction for the target data is received, trigger the data transmitting unit;

the data transmitting unit is executed to transmit the target data to the target client through the established communication connection;

wherein, the apparatus further comprises a display portion determining unit, which is executed to, when the thumbnail of the target data is moved across a boundary of the first and second split screens according to the drag instruction, determine the location $T_1$ of the thumbnail on the first split screen and a portion to be displayed $D_{S1}$ of the thumbnail on the first split screen according to the drag instruction, display the portion to be displayed $D_{S1}$ at the location $T_1$, and send location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail;

wherein the data transmission instruction monitoring unit comprises a thumbnail monitoring subunit and a data transmission instruction determining subunit;

wherein, the thumbnail monitoring subunit is executed to monitor whether a ratio of the portion to be displayed $D_{S2}$ of the thumbnail displayed on the second split screen to the whole of the thumbnail is greater than a preset ratio threshold when a release operation on the thumbnail is performed by the user following the drag instruction, in response to the ratio of the portion to be displayed $D_{S2}$ of the thumbnail displayed on the second split screen to the whole of the thumbnail is greater than the preset ratio threshold when the release operation on the thumbnail is performed by the user, trigger the data transmission instruction determining subunit;

the data transmission instruction determining subunit is executed to determine that the data transmission instruction for the target data is received.

4. The apparatus according to claim 3, wherein, the source client comprises a communication unit $T_{U1}$, and the target client comprises a communication unit $T_{U2}$, the communication unit $T_{U1}$ being identical to the communication unit $T_{U2}$;

the communication connection establishing unit is specifically executed to:

in the case that the preset condition of establishing a communication connection is satisfied, establish the communication connection between the source client and the target client by invoking the communication unit $T_{U1}$ to establish a communication connection with the communication unit $T_{U2}$.

5. A mobile terminal, wherein, it comprises a housing, a processor, a memory, a circuit board and a power supply circuit, wherein the circuit board is disposed inside a space enclosed by the housing, the processor and the memory is provided on the circuit board, the power supply circuit is used for supplying power to each circuit or device of the mobile terminal, the memory is used for storing executable program codes, the display screen is divided into a first split screen for displaying a running interface of a source client which is a client in a foreground running state in the mobile terminal and a second split screen for displaying a running interface of a target client which is a client in a foreground running state in the mobile terminal, the processor performs the following steps by executing the executable program codes of the source client stored in the memory:
  monitoring whether a duration of a long press operation on a thumbnail of target data in the first split screen by a user is greater than a preset duration;
  in response to the duration of the long press operation on the thumbnail of the target data in the first split screen by the user is greater than the preset duration, establishing a communication connection between the source client and the target client;
  receiving a drag instruction for the thumbnail of the target data in the first split screen for moving the thumbnail according to the drag instruction by the user;
  when the thumbnail of the target data is moved across a boundary of the first and second split screens according to the drag instruction, determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail;
  monitoring whether a ratio of the portion to be displayed $D_{S2}$ of the thumbnail displayed on the second split screen to the whole of the thumbnail is greater than a preset ratio threshold when a release operation on the thumbnail is performed by the user following the drag instruction;
  in response to the ratio of the portion to be displayed $D_{S2}$ of the thumbnail displayed on the second split screen to the whole of the thumbnail is greater than the preset ratio threshold when the release operation on the thumbnail is performed by the user:
    sending a data transmission instruction for the target data to the target client; and
    transmitting the target data to the target client for displaying the thumbnail in the second split screen through the established communication connection.

6. The mobile terminal according to claim 5, wherein, the source client comprises a communication unit $T_{U1}$, and the target client comprises a communication unit $T_{U2}$, the communication unit $T_{U1}$ being identical to the communication unit $T_{U2}$;
  the mobile terminal is used for:
    establishing the communication connection between the source client and the target client by invoking the communication unit $T_{U1}$ to establish a communication connection with the communication unit $T_{U2}$.

7. A non-transitory storage medium, wherein, it is used for storing executable program codes, the executable program codes being executed to perform the following steps:
  monitoring whether a duration of a long press operation on a thumbnail of target data in a first split screen by a user is greater than a preset duration;
  in response to the duration of the long press operation on the thumbnail of the target data in the first split screen by the user is greater than the preset duration, establishing a communication connection between the source client and the target client; wherein the source client is a client in a foreground running state in a mobile terminal, the mobile terminal, by means of a split-screen function, divides a display screen thereof into a first split screen for displaying a running interface of the source client and a second split screen for displaying a running interface of a target client, and the target client is a client in a foreground running state in the mobile terminal;
  receiving a drag instruction for the thumbnail of the target data in the first split screen for moving the thumbnail according to the drag instruction by the user;
  when the thumbnail of the target data is moved across a boundary of the first and second split screens according to the drag instruction, determining a location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and a pattern of the thumbnail to the target client through the established communication connection, so that the target client determines a location $T_2$ of the thumbnail of the target data on the second split screen and a portion to be displayed $D_{S2}$ of the thumbnail on the second split screen according to the received information, and displays the portion to be displayed $D_{S2}$ at the location $T_2$, wherein, the portion to be displayed $D_{S1}$ and the portion to be displayed $D_{S2}$ constitute the whole of the thumbnail;
  monitoring whether a ratio of the portion to be displayed $D_{S2}$ of the thumbnail displayed on the second split screen to the whole of the thumbnail is greater than a preset ratio threshold when a release operation on the thumbnail is performed by the user following the drag instruction;
  in response to the ratio of the portion to be displayed $D_{S2}$ of the thumbnail displayed on the second split screen to the whole of the thumbnail is greater than the preset ratio threshold when the release operation on the thumbnail is performed by the user:
    sending a data transmission instruction for the target data to the target client; and
    transmitting the target data to the target client for displaying the thumbnail in the second split screen through the established communication connection.

* * * * *

UNITED STATES PATENT AND TRADEMARK OFFICE
CERTIFICATE OF CORRECTION

PATENT NO. : 10,761,713 B2
APPLICATION NO. : 15/532440
DATED : September 1, 2020
INVENTOR(S) : Juan Hu et al.

Page 1 of 1

It is certified that error appears in the above-identified patent and that said Letters Patent is hereby corrected as shown below:

On the Title Page

The order of assignees is changed to the following:
1. Beijing Kingsoft Office Software, Inc.
2. Zhuhai Kingsoft Office Software Co., LTD.
3. Guangzhou Kingsoft Mobile Technology Co., LTD.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*